United States Patent [19]
DeGroot et al.

[11] Patent Number: 5,735,095
[45] Date of Patent: Apr. 7, 1998

[54] TRACK SEAL

[75] Inventors: Michael DeGroot, Kentwood; Lee M. Jorgenson, Grand Rapids, both of Mich.

[73] Assignee: MOL Belting Company, Grand Rapids, Mich.

[21] Appl. No.: 701,844

[22] Filed: Aug. 23, 1996

[51] Int. Cl.[6] .................................................. E04B 1/62
[52] U.S. Cl. ...................... 52/393; 404/67; 52/396.04; 52/396.08
[58] Field of Search .................... 52/29, 393, 395, 52/396.06, 396.07, 396.04, 396.05, 396.08, 396.09; 404/47, 67, 68, 69; 14/73.1

[56] References Cited

U.S. PATENT DOCUMENTS 4,572,702  2/1986  Bone ............................. 404/67 X

FOREIGN PATENT DOCUMENTS 416710  1/1967  Switzerland ......................... 404/67

*Primary Examiner*—Creighton Smith
*Attorney, Agent, or Firm*—Varnum, Riddering, Schmidt & Howlett LLP

[57] ABSTRACT

A seal for covering a track in a floor is disclosed which is flexible in the upward direction to permit an arm or the like moving on the track to pass through the seal and is considerably less flexible in the downward direction into the channel and capable of supporting a person or equipment traversing the channel. The difference in flexibility in the two directions is obtained by providing a relatively thin material in the area of the hinge section and a relatively thicker material in the cover portion extending over the channel. The relatively thicker material section may be formed by affixing a narrow strip of flexible material to a wider strip of the material. The narrow strip may be affixed to the wider strip by welding or fusing.

9 Claims, 1 Drawing Sheet

TRACK SEAL

BACKGROUND OF THE INVENTION

1. Field of the Invention

This invention relates to a flexible seal or cover for a channel or groove in a floor and, in particular, to a seal that is sufficiently flexible in the upward direction but resists flexion in he downward direction.

2. Description of the Related Art

Channels or grooves in the floors of, e.g., warehouse and manufacturing plants are necessary for many reasons including inset powered tracking, but pose a danger to persons who must traverse the channels. For example, an inverted power and free system may include an inset track in the floor which powers and guides an arm attached to some apparatus or equipment. This system requires a channel in the floor to accommodate the track along which the arm moves. However, the presence of this gap in the floor surface is an inherent danger to workers traversing the channel because it presents the potential to catch the unsuspecting worker's shoe or boot, thereby tripping and causing injury to the worker.

Accordingly, a seal is commonly used to cover the track channel in order to mitigate the dangers presented to workers. Prior seals have been constructed of two opposing, elongated pieces of flexible materials. One edge portion of each piece is mounted to the floor adjacent the gap to form a hinge section, allowing the two pieces to pivot in the upward direction. Another edge portion of each piece extends toward the other piece to substantially cover the gap. The seal must be sufficiently flexible to allow an arm moving along the track to flex the floor mounted pieces out of the seal upwardly, in a direction away from the track, with relative ease. Prior art seals have substantially the same degree of flexibility in the downward direction, into the channel as in the upward direction. Typically, the channel is relatively wide and the seal does not have enough rigidity to support a person stepping on the seal in the area of the channel. Consequently, prior art seals pose a danger to personnel traversing the seal in the area of the channel.

SUMMARY OF THE INVENTION

In accordance with the present invention there is provided a seal which is flexible in the upward direction away from the track, to permit passage of an arm to move with relatively low resistance and is considerably less flexible in the downward direction into the channel and capable of supporting a person or equipment traversing the channel. Consequently, the potential for injury to personnel traversing the channel is greatly reduced. The difference in flexibility in the two directions is obtained by providing a hinge section on each piece having relatively high flexibility and a cover portion, extending over the channel, having relatively low flexibility. In this manner, the seal provides a high resistance to downward pressure over the channel while providing a low resistance to upward pressure from the track driven arm or the like. In a particular embodiment of the invention, the difference in flexibility in the two directions is obtained by providing each of the two opposing pieces with a relatively thin material section in the area of the hinge section and a relatively thicker material section where the seal extends over the channel. In one particular embodiment of the invention a relatively narrower strip of flexible material is affixed to the wider strip of material by welding or fusing. Advantageously, such a seal may be readily manufactured using a standard belting material and by welding or fusing the two pieces to each other, using well-known manufacturing techniques.

BRIEF DESCRIPTION OF THE DRAWINGS

An embodiment of the invention is described with reference to the drawings in which.

DETAILED DESCRIPTION

Figure 1:
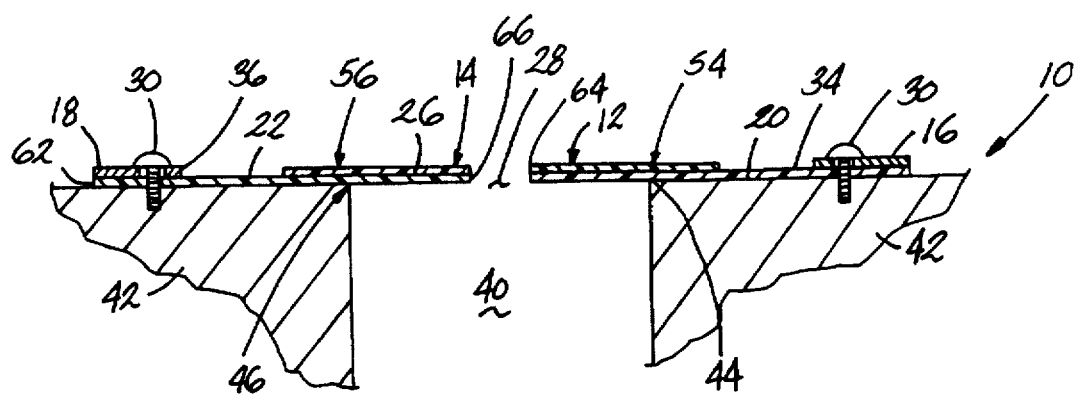
FIG. 1 is a sectional view of an assembled track seal, installed in a floor to cover a track portion of an inverted power and free system, according to the invention.
Figure 2:
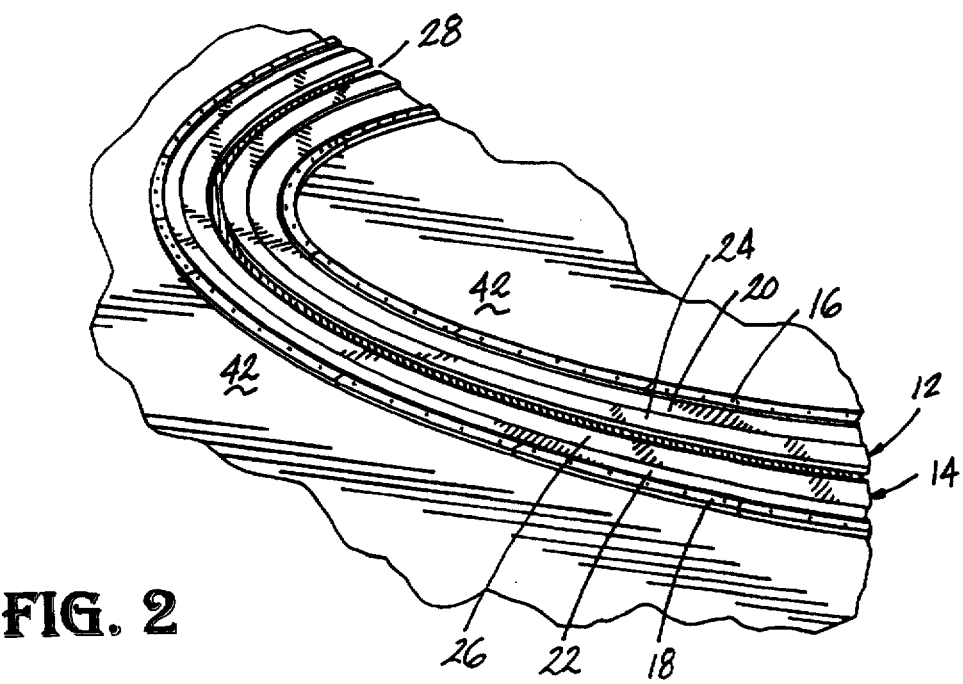
FIG. 2 is a perspective view of an assembled curved track seal.

Referring now to FIGS. 1 and 2, a track seal 10 comprises opposing seal sections 12 and 14 extending over a channel 40 in floor 42. The channel 40 may accommodate a track and an arm traveling along the track and applying a force in the upward direction to the track seal as the arm moves on the track. Although the invention is described herein with respect to the movement of an arm of an inverted power and free system, it will be appreciated by those skilled in the art that the track seal of the invention will be equally useful in other applications where a seal is required over a channel or the like and the seal must provide relatively low resistance to forces applied in one direction and higher resistance to forces applied in an opposite direction.

The opposing seal sections 12 and 14 rigidly secured to a permanent structure, such as the floor 42, at fixed ends 60 and 62, respectively, on opposite sides of the channel 40. Each of the opposing seal sections 12 and 14 comprises a narrow strip (24, 26) laminated to a wider strip (20, 22) at a free end (64, 66) extending over the channel 40. The fixed ends 60, 62 are secured to the floor 42 by fasteners 30 extending through mounting plates 16, 18 into the floor 42 adjacent the fixed ends 60, 62. Free ends 64, 66 of seal sections 12 and 14 extend toward each other over and substantially across the channel 40, but separated by a gap 28 over the center of the channel 40. The preferred width of the opposing seal sections 12, 14 is a function of the width of the channel. For a five inch wide channel, the narrow strips 24, 26 may be approximately three inches wide and the wider strips 20, 22 may be on the order of six inches wide. For such a channel, the gap 28 between the opposing seal sections 12 and 14 may be approximately one inch. The strips 20, 22, 24, 26 may be made of a plastic material used in various commercial belting applications, such as the commercially available plastic material sold by Akzo Corporation under the trade name Arnitel or sold by DuPont Company under the trade name Hytrel. In the preferred embodiment, the strips 20, 22, 24, and 26 are made of a material comprising two parts of Arnitel and one part of Hytrel. Other suitable materials may also be used. The narrow strips 24, 26 and the wider strips 20, 22 may be of approximately equal thickness. A suitable thickness for a five inch channel is on the order of three millimeters.

The opposing seal sections 12, 14 may be either straight or curved to cover, respectively, a straight or a curved channel. FIG. 2 is a perspective view of an assembled track seal over a curved channel. The opposing seal sections 12 and 14 are preferably constructed by laminating or fusing the narrow strips 24, 26 to the wider strips 20, 22. Thus, each seal section comprises a single layer portion and a double layer portion. Other methods of attaching the separate strips to each other, such as gluing or mechanically fastening, may also be used.

During operation of an inverted power and free system an arm (not shown in the drawing) is supported on a track (not shown in the drawing) disposed in the channel 40 under the opposing seal sections 12, 14. As the arm travels along the track in the channel 40 it engages the lower surface of the opposing belt sections 12, 14 and urges the sections 12, 14 in an upward direction. Accordingly, the opposing seal sections tend to flex upwardly in the areas adjacent the mounting plates 16, 18 where the opposing seal sections each comprise a single layer of the material. These areas are designated as easy hinge areas, generally designated at 34, 36, respectively. Because the flexing for movement of the opposing seal sections is in the easy hinge areas, an arm moving through the track channel 40 experiences relatively low resistance from the opposing seal sections.

When an arm, or apparatus driven by an arm, is not present in the area of the track channel 40, personnel or equipment may safely cross the channel 40 on the track seal 10. Weight placed on the track seal 10 by personnel or equipment traversing the channel causes pressure to be applied in the downward direction in the vicinity of the free ends 64, 66 of the opposing seal sections 12, 14, respectively. However, movement of the opposing seal sections in the downward direction is resisted because a flexing of the opposing seal sections, if at all, occurs in the areas 54, 56 of the opposing seal sections adjacent channel edges 44, 46. The hinge areas 54, 56 are referred to as difficult hinge areas and are disposed in areas of the opposing seal sections which consist of a thicker, two-ply construction formed by the overlay of the narrow strips 24, 26 on relatively wider strips 20, 22 and which extend beyond channel edges 44, 46. The thicker, two-ply construction in the area of the downward pivot effectively resists movement in the downward direction, thereby decreasing a potential for injury or damage to personnel or equipment as the channel 40 is traversed.

It will be understood that reasonable variations and modifications of the above-described arrangement may be devised by those skilled in the art without departing from the scope of the invention as defined by the appended claims. Particularly, the opposing seal sections 12, 14 may each be formed as a single section of differing thicknesses near opposing ends, rather than formed from two laminated strips as described. It will be understood that when laminated strips are used, the narrower strip could be added under, rather than on top of, the wider strip without departing from the scope of the invention. Furthermore, a seal for covering a channel may comprise a section of relatively stiff material longitudinally joined to a section relatively sorer material by which the seal is mounted along an edge of the channel. In a further embodiment of the invention the seal may comprise strips formed of a relatively inflexible material, each attached along an edge of the channel, and provided with longitudinally extending slits in the underside of the material in the areas adjacent the edges to facilitate hinging the strips in the area of attachment.

What is claimed is:

1. In combination a channel disposed in a floor and adapted for guiding a moving object and a flexible seal for coveting the channel, the channel having opposing channel edges, the seal comprising:
    an elongated strip having first and second longitudinally extending edge portions and comprising a relatively flexible hinge portion along a first longitudinally extending edge mounted adjacent one of the channel edges and a relatively less flexible cover portion extending from the one of the channel edges and over at least a portion of the channel;
    whereby the seal provides relatively low resistance to a force in a direction extending outwardly from the channel and a relatively higher resistance to a force in a direction extending inwardly toward the channel.

2. A split seal for coveting a channel having opposing channel edges, the seal comprising:
    a pair of elongated strips each having first and second longitudinally extending opposite edges;
    each of the strips comprising a relatively flexible hinge portion extending along the first longitudinally extending edge and adapted to be mounted on a channel edge and a relatively less flexible cover portion extending between the relatively flexible hinge portion and the second longitudinally extending edge and adapted to extend over a channel portion;
    whereby the pair of elongated strips together form a channel seal having a flexible hinge portion providing low resistance to force on the seal in one direction and a less flexible cover portion forming a channel cover and providing a high resistance to a force in a direction opposite the one direction.

3. The split seal in accordance with claim 2 wherein the relatively flexible portion comprises a relatively thin layer of a selected material and the relative less flexible portion comprises a relatively thicker layer of the selected material.

4. The split seal in accordance with claim 3 wherein the relatively thin layer of the selected material comprises a single layer of the selected material and the relatively thicker layer comprises multiple layers of the selected material.

5. The split seal in accordance with claim 4 wherein the relatively thicker layer is formed by laminating a strip of the selected material on the relatively thin layer of the selected material.

6. In combination, a channel for accommodating a track and having opposing channel edges and a track seal arranged to move in a direction outward from the channel with relatively low resistance and to move inwardly toward the channel with a relatively higher resistance, the seal comprising:
    first and second opposing seal sections each having a first, relatively flexible part fixedly mounted in a seal mounting area outside the channel and adjacent selected one of the channel edges and a second, relatively less flexible part extending over the channel and over the one of the channel edges;
    whereby each of the first and second seal sections are movable outwardly from the channel with relatively low resistance by pivoting of the relatively flexible parts in the seal mounting area and the first and second seal sections resist movement into the channel by pivoting of the relatively less flexible parts on the channel edges.

7. The combination in accordance with claim 6 wherein the first, relatively flexible part comprises a relatively thin layer of a selected material and the second relatively inflexible part comprises a relatively thicker layer of the selected material.

8. The combination in accordance with claim 7 wherein the relatively thin layer comprises a single layer of the selected material and the relative thicker portion comprises multiple layers of the selected material.

9. The combination in accordance with claim 7 wherein the relatively thinner layer comprises a single layer of the selected material and the relatively thicker layer is formed by laminating a strip of the selected material on the relatively thin layer of the selected material.

* * * * *

UNITED STATES PATENT AND TRADEMARK OFFICE
CERTIFICATE OF CORRECTION

PATENT NO. : 5,735,095
DATED : Apr. 7, 1998
INVENTOR(S) : DeGroot, et al.

It is certified that error appears in the above-indentified patent and that said Letters Patent is hereby corrected as shown below:

```
Col. 3, line 56:
     delete "for" (second occurrence)
Col. 3, line 57:
     delete "coveting" and substitute therefor --covering--
Col. 4, line 3:
     delete "coveting" and substitute therefor --covering--
```

Signed and Sealed this

Twenty-eighth Day of July, 1998

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,735,095

DATED : April 7, 1998

INVENTOR(S) :
DeGroot, et al.

It is certified that error appears in the above-identified patent and that said Letters Patent is hereby corrected as shown below:

Column 4, line 40, after "adjacent" insert --a--.

Column 4, line 43, before "one" insert --selected--.

Signed and Sealed this

Twenty-second Day of September, 1998

*Attest:*

BRUCE LEHMAN

*Attesting Officer*     *Commissioner of Patents and Trademarks*